UNITED STATES PATENT OFFICE.

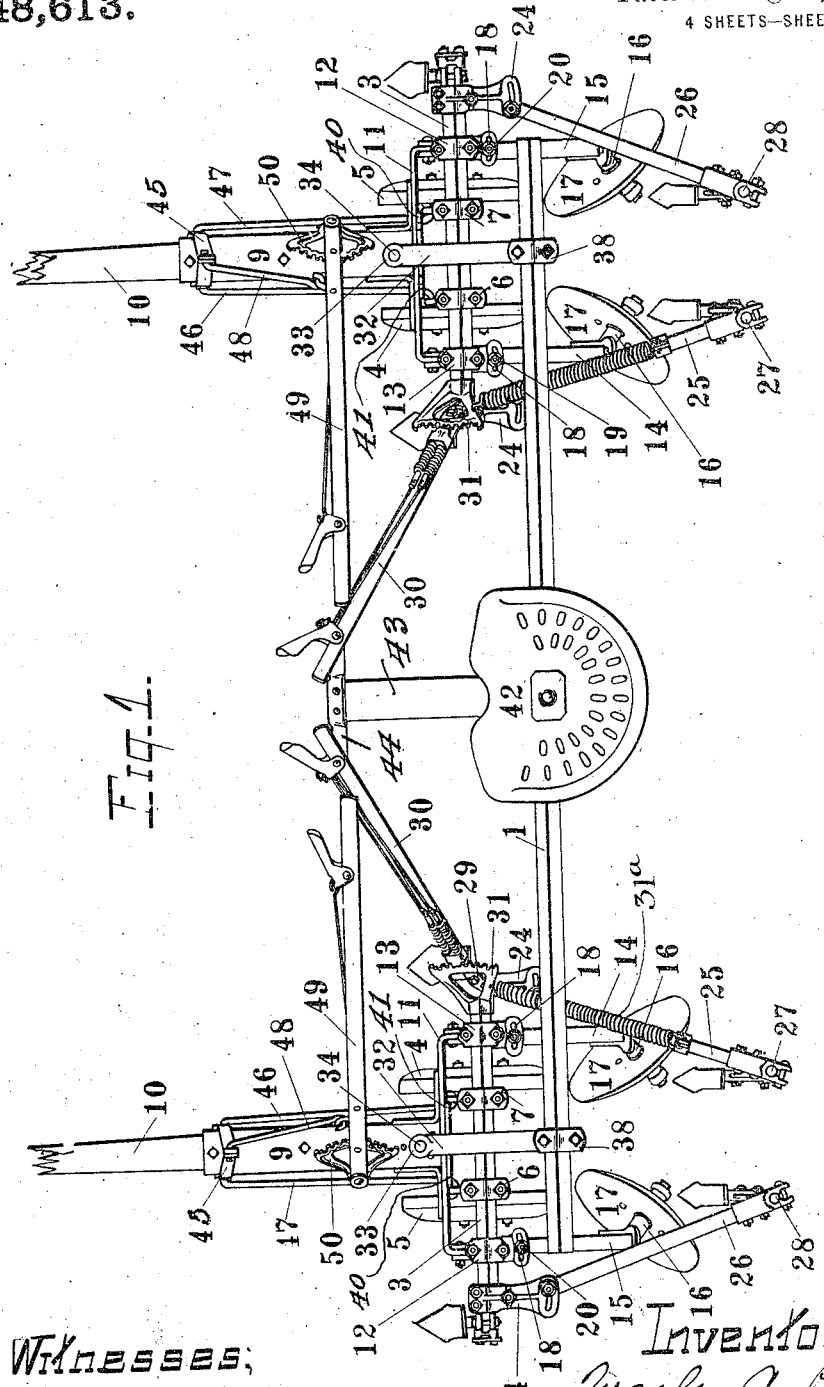

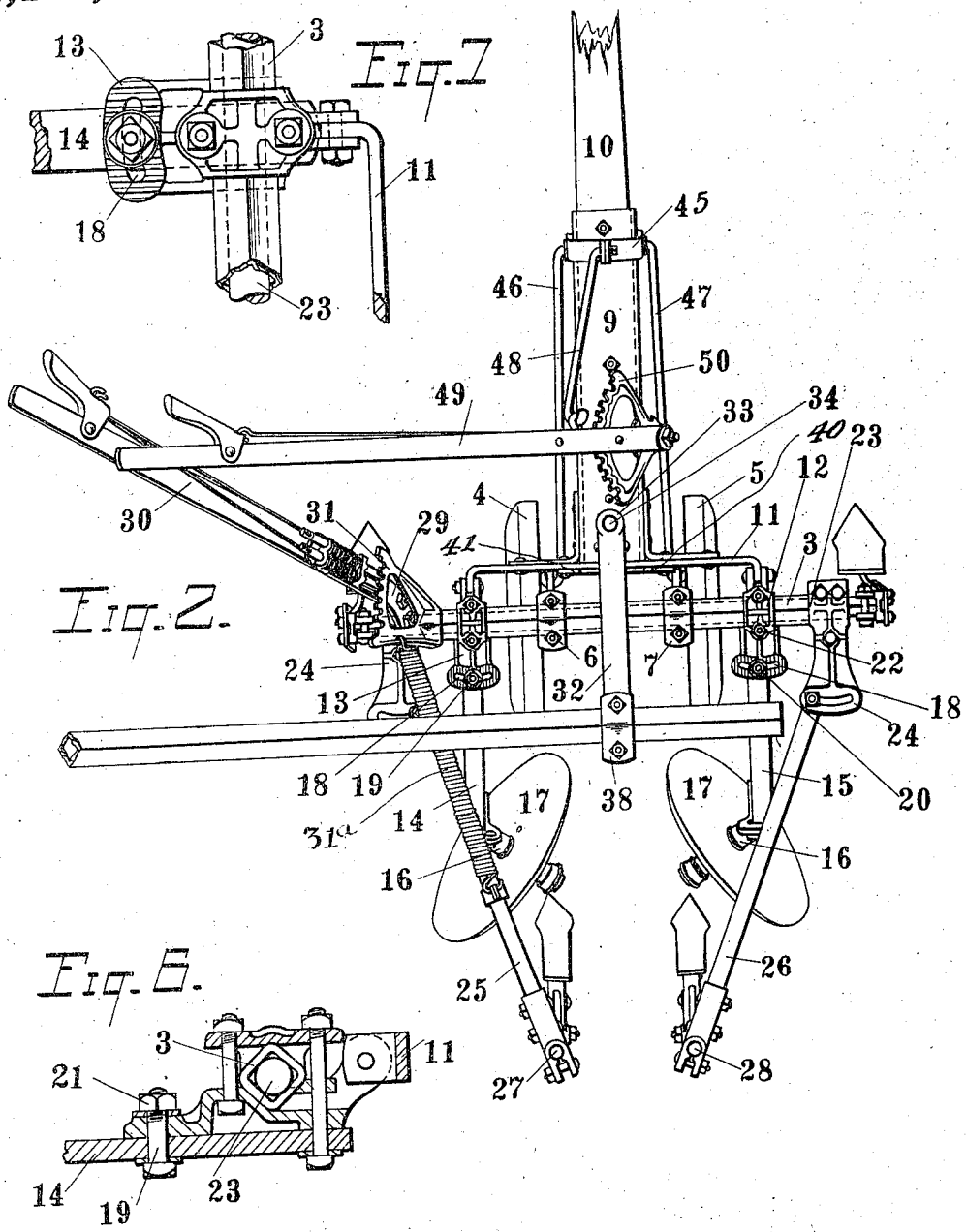

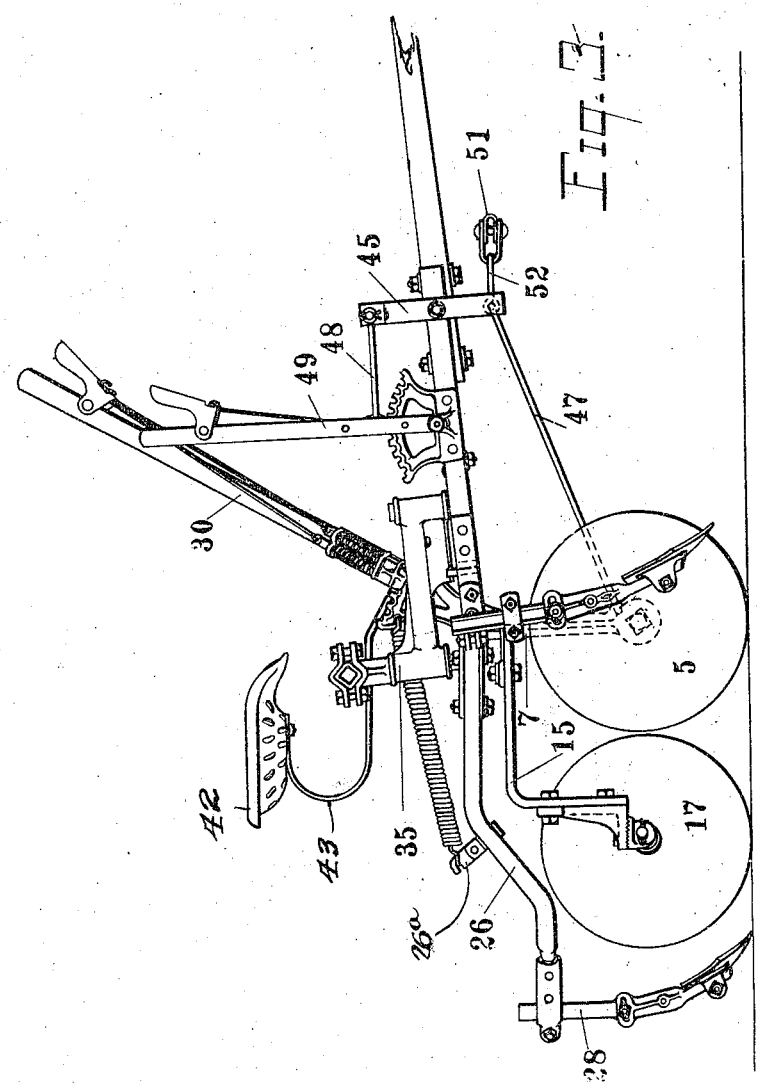

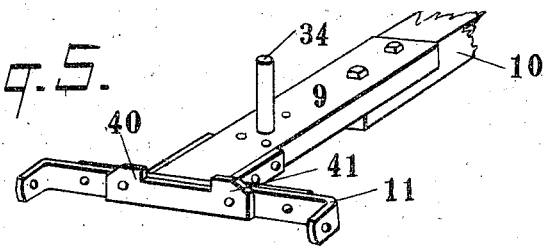
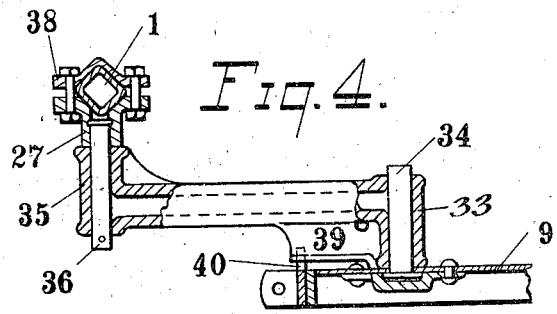
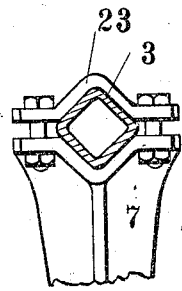
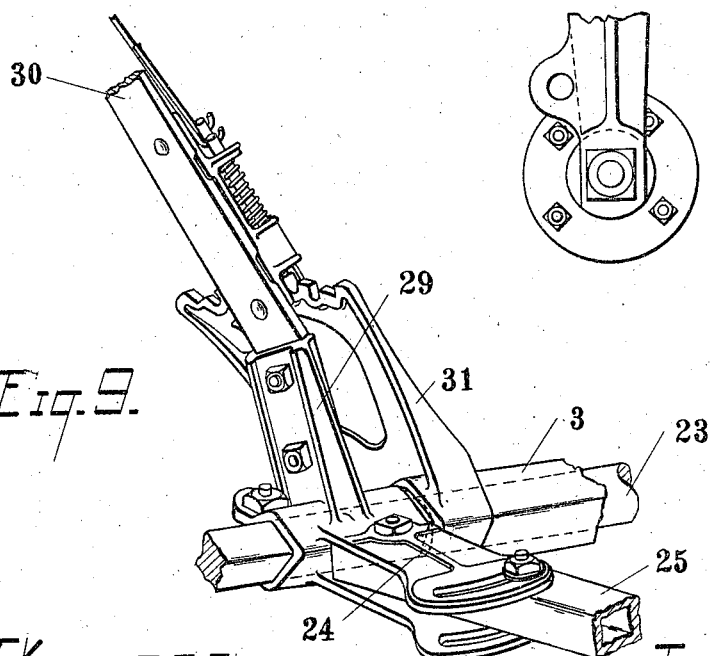

WESLEY A. PAUL, OF MOLINE, ILLINOIS, ASSIGNOR TO DEERE & COMPANY, OF MOLINE, ILLINOIS, A CORPORATION OF ILLINOIS.

LISTER-CULTIVATOR.

1,148,613.

Specification of Letters Patent. Patented Aug. 3, 1915.

Application filed October 14, 1912. Serial No. 725,708.

*To all whom it may concern:*

Be it known that I, WESLEY A. PAUL, a citizen of the United States, residing at Moline, in the county of Rock Island and State of Illinois, have invented certain new and useful Improvements in Lister-Cultivators, of which the following is a specification, reference being had therein to the accompanying drawing.

This invention has reference more particularly to improvements in that class of implements known as lister-cultivators, adapted to cultivate two rows simultaneously, and having gangs of cultivating devices flexibly and adjustably connected to the opposite ends of a spreader-bar.

The objects of my invention are to construct the cultivator so that the gangs may have sufficient freedom of movement laterally to better conform to any deviation of the furrows from a straight course; to improve the adjustability of the gangs, and to simplify the construction and operation.

Referring to the accompanying drawings in which similar numerals of reference indicate identical parts—Figure 1 is a plan view of a lister-cultivator containing my improvements. Fig. 2 is an enlarged plan of one of the gangs. Fig. 3 is a side elevation. Fig. 4 is a detail in part section. Figs. 5, 6, 7, 8, and 9 are views of various parts of the gangs as will be hereinafter fully described.

At each end of the spreader-bar 1 is flexibly connected a gang of cultivating devices, and as they are similar in construction and operation, a description of one gang will suffice for both, reference numerals used being identical in both gangs.

A frame-bar 3 is supported on ground-wheels 4 and 5 journaled on standards 6 and 7 clamped to the frame-bar and capable of adjustment to or from each other to vary the space between the wheels to accommodate the width of the furrow. The tongue is composed preferably of two parts, the rear part 9 being preferably of channel steel and rigidly secured to the forward part 10 which may be either of wood or metal. Bolted to the rear of the part 9 is a transverse bar 11, its ends bent rearwardly to register with forward ends of brackets 12 and 13 and pivotally secured thereto, the brackets 12 and 13 being clamped to the frame-bar 3. Cultivating devices consisting of beams carrying disks or shovels and projecting rearwardly, are secured to the frame-bar 3 in the following manner: Projecting rearwardly and pivoted at their forward ends to brackets 12 and 13, and forwardly of the frame-bar 3, are beams 14 and 15, their rear portions bent downwardly and having secured thereon castings 16 on which are journaled cultivating disks 17, adjustable for inthrow or outthrow by changing them from one side to the other of the downwardly bent portions of the beams 14 and 15. The brackets 12 and 13 extend rearwardly of the pivotal points of the beams 14 and 15 thereon, and have horizontally disposed arcuate slots 18, receiving bolts 19 and 20 in the beams 14 and 15; the ends of the bolts are threaded for nuts 21 and 22, so that the beams 14 and 15 can be securely held in any position of lateral adjustment to which they may be swung on their pivotal connection to the brackets 12 and 13.

Extending through the frame-bar 3, rockable therein, and of greater length to project beyond the ends thereof, is a rocking-bar 23, on which are secured brackets 24 adjacent the ends of frame-bar 3; rearwardly extending beams 25 and 26 are pivoted on brackets 24 rearwardly of the rocking-bar 23 and are secured in any position of lateral adjustment in a similar manner as beams 14 and 15; on the rear end of beams 25 and 26 are adjustable standards 27 and 28 fitted with shovel blades. Additional cultivating devices may be mounted on the extreme ends of the rocking-bar 23 as shown.

The bracket 24, on the inner end of the rocking-bar 23, has an upwardly projecting arm 29 to which is secured a lever 30 engaging, by latch thereon, with a segment 31 on the frame-bar 3, so that the bar 23 can be rocked to raise or lower the cultivating devices thereon irrespective of the adjustment of the frame-bar 3 and its cultivating devices. A coiled spring 31ª is connected to the segment 31 and to a member 26ª on the beam 25, and adds materially to the facility of raising or lowering the cultivating devices by rocking the beam 3. The lever 30

I construct in such a manner as to secure extreme nicety of adjustment of the cultivating devices on the rocking-bar 23.

Flexible connection of each of the gangs with the spreader-bar 1, consists of a forwardly extending link 32 having a vertical sleeve or socket 33 at its forward end, which movably engages with a pin 34 rigidly mounted on the tongue; at the rear end of the link 32 is a similar vertical socket 35 engaging with a pin 36 rigidly connected to the lower portion 37 of a clamp 38 on the spreader-bar 1. Beneath each link, preferably integral therewith and rearward of the socket 33, is a web 39 which extends rearward a sufficient distance to engage with stops 40 and 41 on the rear of the tongue, to limit the lateral swing of the links 32 and the spreader-bar 1. Midway of the spreader-bar 1 a seat 42 is mounted on a support 43 firmly bolted to the spreader-bar; and extending forwardly and downwardly, and having a foot-rest 44 secured to the forward end.

Pivotally mounted on each tongue is a forked lever, 45, straddling the tongue and extending below it to connect with draft-rods 46 and 47 which are connected to the standards 6 and 7. The upper end of the forked lever 45 is joined by a rod 48 to a lever 49 pivotally mounted on the tongue and fitted with a latch to engage with a segment 50 also mounted on the tongue. A whiffletree 51, to which horses are to be hitched, is connected to a link 52 on the lower ends of the forked lever 45. By the construction just described it is apparent that, after the cultivating devices have been lowered to contact with the ground and the latch on the lever 49 disengaged from the segment 50, the draft of the team will be employed to force the cultivating devices into the soil.

The links 32 supporting spreader-bar 1 upon which the seat is mounted, have their horizontal portions substantially parallel with the tongues, and when the tongues are inclined upwardly, as during the operation of the machine, the links have a rearwardly downward inclination; ordinarily this would result in destroying the balance of the machine by the weight of the driver; but as the links are pivoted forwardly on the tongues, and the latter are pivotally connected to the cultivator frames forward of the axes of the wheels 4 and 5, the weight of the driver tends to offset the weight of the cultivating devices when the latter are raised and the balance of the machine is more easily maintained. By the rearward and downward inclination of links 32 their lateral movement is more quickly responsive to lateral movement of the gangs when following inequalities in the rows being cultivated, and the central position of the driver's seat on the spreader-bar, in relation to the gangs, is more easily maintained.

What I claim is—

1. In a lister cultivator having a plurality of cultivator gangs, the combination with a tongue for each gang and pivotally connected thereto, of a transverse spreader-bar, a link pivoted on each tongue by a pivot at a right angle to the tongue and adapted to swing laterally, a vertical pivot connecting each link with the spreader-bar, and means on the links engaging with means on either of the tongues to limit the lateral movement of the links.

2. In a lister-cultivator, the combination with a tubular-frame-bar, of ground-wheels supporting the frame-bar, a bar journaled in the frame-bar and extending beyond the ends thereof, and cultivating devices on both bars.

3. In a lister-cultivator, the combination with a tubular-frame-bar, of a support therefor, a rocking-bar journaled in the frame-bar of a greater length than the frame-bar and cultivating devices attached to both ends of the rocking-bar and movable therewith.

4. In a lister-cultivator, the combination with a tubular-frame-bar, of ground-wheels supporting the frame-bar, a rocking-bar journaled in the frame-bar and extending beyond the ends thereof, and cultivating devices pivotally secured to both bars and laterally adjustable on their pivots.

5. In a lister-cultivator, the combination with a tubular-frame-bar, of ground-wheels supporting the frame-bar, a rocking-bar journaled in the frame-bar and extending beyond the ends thereof, and cultivating devices pivotally secured to both bars and laterally adjustable on their pivots, and means to hold them in adjusted positions.

6. In a lister-cultivator, the combination with a tubular frame-bar, of ground-wheels supporting the frame-bar, cultivating devices attached to the frame-bar, a rocking-bar journaled in the frame-bar and projecting beyond the ends thereof, cultivating devices on the rocking-bar, and means on the rocking-bar to raise or lower the cultivating devices attached to the rocking-bar independent of the adjustment of the cultivating devices attached to the frame-bar.

7. In a lister-cultivator, the combination with a tubular frame-bar, of cultivating devices carried by the frame-bar and pivoted forwardly thereof, a rocking-bar journaled in the frame-bar and of greater length thereof, and cultivating devices carried by the rocking-bar and pivoted rearward of the latter.

8. In a lister-cultivator, the combination with a tubular frame-bar, of brackets on the frame-bar, laterally adjustable cultivating devices pivoted on the brackets forwardly of the frame-bar, a rocking-bar journaled in the frame-bar and of greater length than the frame-bar, brackets on the rocking-bar, and laterally adjustable cultivating devices pivoted on the brackets rearwardly of the rocking-bar.

9. In a lister-cultivator, the combination with a tubular frame-bar, of a support therefor, a rocking-bar journaled in the frame-bar and of a greater length than the frame-bar, cultivating devices attached to the rocking-bar, a lever on the rocking bar to move the latter to vary the vertical adjustment of the cultivating devices thereon, said lever adapted to engage with a rack on the frame bar in which the rocking-bar is journaled, to hold the cultivating devices in varied adjustment.

10. In a lister-cultivator, the combination with a tubular-frame-bar, of ground-wheels supporting the frame-bar and laterally adjustable thereon, a tongue pivoted to the frame-bar forward of the axes of the ground-wheels, cultivating devices attached to the frame-bar, a rocking-bar journaled in the frame-bar and projecting beyond the ends thereof, cultivating devices attached to the rocking-bar, and means to adjust said cultivating devices independent of the adjustments of the cultivating devices attached to the frame-bar.

11. In a lister-cultivator, the combination with a tubular-frame-bar, a rocking-bar journaled in the frame-bar and of greater length than the frame-bar, a bracket on the rocking-bar adjacent the frame-bar, a rearwardly extending beam pivoted thereon and carrying cultivating devices, and a cultivating device secured on the end of the rocking-bar.

12. In a lister-cultivator, the combination with a tubular-frame-bar, a rocking bar journaled in the frame-bar and of greater length than the frame-bar, a bracket on the rocking-bar adjacent the frame-bar having cultivating devices attached thereto, a lever rigid with the bracket, and a segment on the frame-bar with which the lever engages.

13. In a lister cultivator, the combination of a tubular frame-bar, a rocking-bar journaled in the frame-bar and projecting beyond the ends thereof, cultivating devices secured to the frame-bar and rocking bar, ground wheels supporting the frame-bar, a tongue pivotally connected to the frame-bar forwardly of the axes of the ground-wheels, a hitch device on the tongue, and a connection between the ground-wheel support and the hitch device whereby the pull of the team will force the cultivating devices into the soil.

14. In a lister-cultivator, the combination of a tubular frame-bar having a rocking bar journaled therein and projecting beyond the ends thereof, cultivating devices pivotally attached to both bars, ground-wheels supporting the frame-bar, a tongue pivotally connected to the frame-bar forwardly of the axes of the ground-wheels, a hitch device on the tongue, a connection between the ground-wheel support and the hitch device whereby the pull of the team will force the cultivating devices into the soil, and a lever on the tongue and connected with the hitch device to regulate the depth of penetration.

15. In a lister-cultivator, the combination with a tubular frame-bar, of ground-wheels supporting the frame-bar, a tongue pivotally connected to said frame-bar forwardly of the axes of the ground-wheels, cultivating devices carried by the frame-bar, a rocking-bar journaled in the frame-bar and projecting beyond the ends thereof, cultivating devices carried by the rocking-bar, a lever on the rocking-bar to vertically adjust the cultivating devices carried by the rocking-bar independent of the position of the cultivating devices on the frame-bar, and a segment on the frame-bar with which the lever on the rocking-bar engages to hold the latter in its adjusted position.

16. In a lister cultivator, the combination with a tubular frame-bar, a rocking bar journaled in the frame bar and of greater length than the frame bar, a bracket on the rocking bar adjacent the frame bar having cultivating devices attached thereto, a lever rigid with the bracket, a segment on the frame bar with which the lever engages and a coil spring connected with said frame bar and cultivating devices.

In testimony whereof I affix my signature, in presence of two witnesses.

WESLEY A. PAUL.

Witnesses:
W. O. DUNKIN,
B. PETERSON.